US005814120A

United States Patent [19]

Lloyd et al.

[11] Patent Number: 5,814,120

[45] Date of Patent: Sep. 29, 1998

[54] SWEEPOUT ASSEMBLY WITH NONMETALLIC PADS

[75] Inventors: Patrick H. Lloyd, Decatur; Kyle D. Nelson, Sanger, both of Tex.

[73] Assignee: Union Oil Company of California, El Segundo, Calif.

[21] Appl. No.: 562,738

[22] Filed: Nov. 27, 1995

[51] Int. Cl.[6] .......... C03B 9/04; C03B 9/44; C03B 11/00; C03B 13/00

[52] U.S. Cl. .......... 65/260; 65/239; 65/241; 414/198

[58] Field of Search .......... 65/260, 239, 241; 414/198

[56] References Cited

U.S. PATENT DOCUMENTS

| | | | |
|---|---|---|---|
| 4,007,028 | 2/1977 | Bublitz et al. | 65/163 |
| 4,162,911 | 7/1979 | Mallory | 65/229 |
| 4,199,344 | 4/1980 | Mumford et al. | 65/260 |
| 4,340,413 | 7/1982 | Rowland | 65/375 |
| 4,966,619 | 10/1990 | Withrow | 65/348 |
| 5,037,466 | 8/1991 | Volsine et al. | 65/260 |
| 5,160,015 | 11/1992 | Perry et al. | 198/468.01 |
| 5,238,347 | 8/1993 | James | 414/165 |
| 5,324,340 | 6/1994 | Withrow et al. | 65/260 |

OTHER PUBLICATIONS

Ware Transfer Products, Glass Production Technology International 1994, p. 73.

Tucker, David, Automatic Lehr Loading, Glass Production Technology International 1992, pp. 145, 146, and 148, 1994.

Stewart, Dan et al., A Systems Approach to Hot Glass Handling, Glass Production Technology International 1992, pp. 141–143.

Stewart et al. Specialization Comes to Hot Glass Handling, Glass Industry, pp. 20–22, Apr. 1989.

Cerberite Hot Glass Handling Materials and Systems, Johnson Radley Limited, data sheets for 0701, 0706, 0707, 0708, 0709, 0710, and 0711, 1989.

Lloyd et al., Serial No. 08/508,646, "Adjustable Hot Glass Transfer Device."

*Primary Examiner*—Donald E. Czaja
*Assistant Examiner*—Jacqueline A. Ruller
*Attorney, Agent, or Firm*—William O. Jacobson; Yale S. Finkle; Gregory F. Wirzbicki

[57] ABSTRACT

A repositionable hot-glass contact pad composed at least in part of a relatively high-strength nonmetallic material having one or more repositionable support projections and a glass-contact surface. The high strength nonmetallic material and use of multiple support projections allow reliable attachment of the pad to a metal support structure in a plurality of positions to handle a variety of hot-glass article shapes and sizes with minimal checking or other damage.

35 Claims, 3 Drawing Sheets

10 9 G 4a Y X Z 13 17 15 12 19a 19 11 U 16 14 8

FIG. 4a.
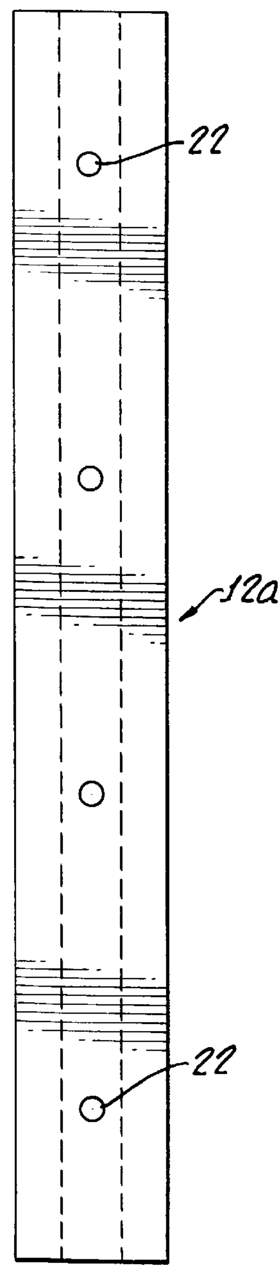
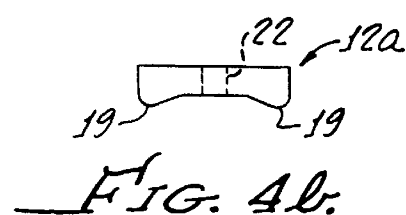
FIG. 4b.
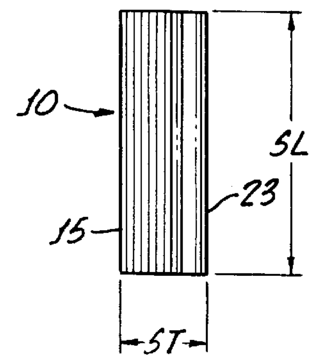
FIG. 5a.
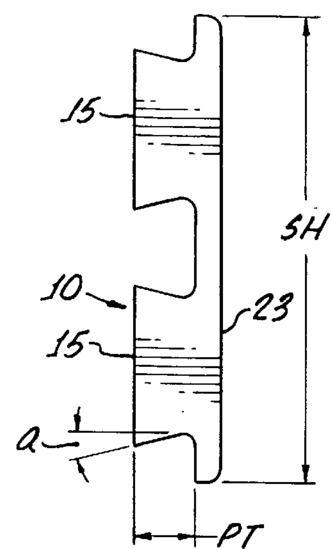
FIG. 5b.

SWEEPOUT ASSEMBLY WITH NONMETALLIC PADS

REFERENCE TO RELATED APPLICATIONS, INCORPORATION BY REFERENCE

This application is related to copending application Ser. No. 08/508,646, filed on Jul. 28, 1995. This prior filed application is incorporated in its entirety herein by reference.

FIELD OF THE INVENTION

This invention generally relates to the field of manufacturing glass articles. More particularly, this invention relates to equipment and materials used to handle hot-glass articles during the manufacturing of such articles.

BACKGROUND OF THE INVENTION

To fabricate a glass article, a mass of molten glass is typically injected or blown into a mold, partially cooled to about 600° C., and the resultant hot-glass article transferred to a conveyor belt for further processing, such as to a lehr oven for annealing. During transfer, the hot-glass article is extremely fragile and susceptible to significant thermal and physical stresses, contamination, and other damage caused by contact with hot-glass transfer equipment or handling fixtures. In addition, annealing or other post-forming process steps may not fully remove added stress concentrations and other damage caused by the handling fixtures or transfer equipment.

Preferably, hot-glass handling fixtures or transfer equipment is made of materials that will minimize stress concentration, contamination, deformation, cracking, checking, or other damage to the hot-glass articles. Furthermore, the materials used to handle the hot-glass articles must themselves be able to withstand the high temperature contact with the hot-glass articles and be rigid enough to ensure proper alignment and placement of the transferred hot-glass articles.

Stainless steel and other metals or metal alloys have been used for the body or support structure of such transfer equipment or fixtures, but metallic materials can cause thermal and/or physical damage if they contact hot-glass articles. In addition, the metal structure may be damaged by exposure to hot-glass articles. Therefore, various nonmetallic contact materials have typically been attached to the metal structure and incorporated into hot-glass fixture designs as inserts, pads, or spacers for contacting the hot-glass articles. Nonmetallic materials can include fabric cloth coverings (such as Apalon or other cloth capable of withstanding high temperatures), asbestos, some plastics, and graphite. However, the use of these nonmetallic materials presents certain drawbacks to glass manufacturing applications.

Although asbestos may have very good thermal and physical properties for this application, using asbestos can create grave environmental and workplace safety concerns. Plastics are generally less well suited for this elevated temperature application and typically have a relatively short service life even when specially formulated to withstand the elevated temperatures encountered in this hot end portion of a glass article manufacturing process. Graphite may be more of an ideal nonmetallic material for handling hot-glass articles since graphite has a nonabrasive surface, an acceptable heat resistance, and a resistance to oxidation at temperatures typically encountered when contacting hot-glass articles. Graphite is also safe for the environment and to those who work with it.

However, graphite presents several problems that must be overcome before it can be economically used as a material for handling hot-glass articles. One problem graphite presents is that it is relatively brittle when compared to metallic or other tougher materials and therefore can chip or crack or be otherwise mechanically damaged in this hot-glass contact application.

Another problem encountered with graphite is the difficulty in removably attaching a graphite contact pad to the supporting body of a fixture. The graphite contact material should be removable since the graphite hot-glass contact surfaces can wear during use and replacement may be needed to adapt the fixture to different glass article shapes and sizes. However, removing graphite pads can also wear the attachment surface causing loosening and unreliable support attachment. Another problem is the need for machinability in order to economically provide an array of graphite contact pads in different shapes and sizes to handle different shapes and sizes of hot-glass articles.

Graphite or carbon composite materials can be combined with plastic resins or fibers to provide added strength, but the added resins and reinforcing fibers create new problems. The resins typically have limited thermal capability, and fiber reinforced compositions are typically not easily machinable, making fabrication of some complex shapes difficult if not impossible. Frequent removal of pads to adapt to different glass articles sizes also increases the risk of damage to composite materials.

One specific device for handling hot-glass articles is a sweepout assembly, sometimes also referred to as an arm, pushout, or wiper. The sweepout assembly is typically used to transfer or sweep hot-glass articles from one or more stationary positions, such as a mold output or deadplate, to a narrow, single line conveyer or machine conveyor. The sweepout assembly may impart motion in several directions, e.g., motion toward or perpendicular to the moving direction of the conveyor belt and motion parallel to the moving direction of the conveyor belt in a sweeping 90 degree arcing motion. If an air pad is used to support the hot-glass articles during transfer to the conveyor belt, the air pad can increase positioning demands on the sweepout assembly, e.g., the hot-glass articles can be positionally unstable when supported by the air pad.

A typical sweepout assembly is composed of a metallic support and a nonmetallic contact element for contacting hot glass, e.g., carbon-based pads attached to the steel support. Variously shaped and sized sweepout assemblies are usually required to handle the needs of a typical glassware manufacturing facility producing different shapes and sizes of glass articles.

SUMMARY OF THE INVENTION

The present invention provides an improved, usually nonmetallic pad for contacting hot-glass articles and assemblies comprising one or more of such pads. The pad preferably contains a surface for contacting hot-glass articles and at least one support connection surface typically composed of a relatively high-strength nonmetallic material. The support connection surface may comprise one or more projections that are preferably shaped to allow repositioning of the pad in more than one direction. A preferred embodiment of a pad includes an arcuate glass-contact surface and dual, horizontally slidable projections, both composed of a graphite usually having a minimum flexural strength of about 4,400 psi. The pad is preferably shaped like a finger having a relatively thick base and a glass-contact arm extending outwardly from the base, which arm has a front concave contact surface and back convex contact surface. The relatively high-strength nonmetallic material and dual projections allow the pads to be rigidly and reliably attached to a metal support structure as well as easily repositionable both horizontally and vertically on the metal support structure. When multiple pads are separated by spacers and attached to the metal support structure, the assembly forms a repositionable mosaic of glass contact surfaces capable of cradling a plurality of glass articles having various shapes and sizes.

BRIEF DESCRIPTION OF THE DRAWINGS

FIG. 4*a* shows a top view of an alternative cap for use as part of the sweepout assembly of the invention;

FIG. 4*b* shows a side view of the cap of FIG. 4*a;*

FIG. 5*a* shows a top view of a spacer for use as part of the sweepout assembly of the invention; and FIG. 5*b* shows a side view of the spacer of FIG. 5*a*.

In these figures, it is to be understood that like reference numerals refer to like elements or features.

DETAILED DESCRIPTION OF THE INVENTION

Figure 1:
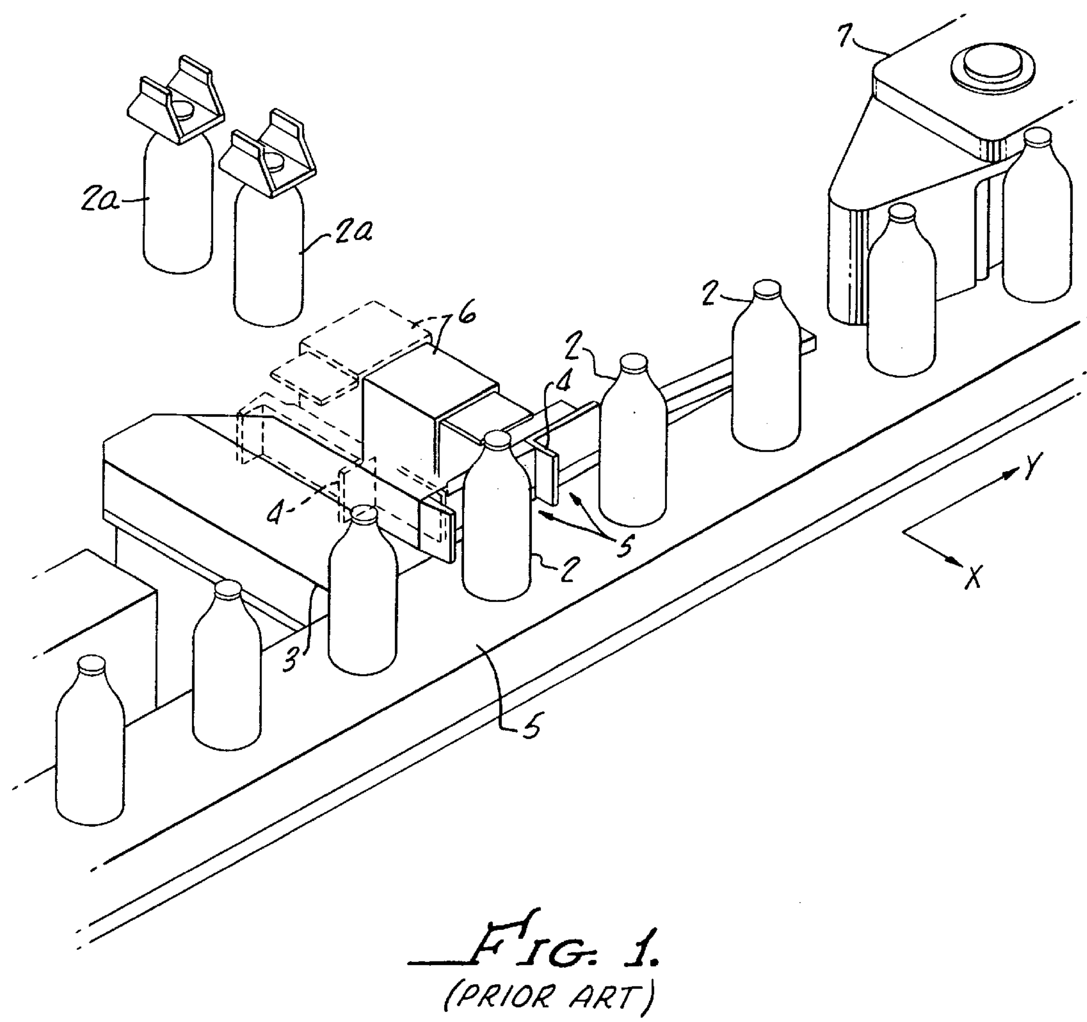
FIG. 1 shows an orthogonal view of a portion of prior art equipment including a sweepout assembly used to fabricate glass.

FIG. 1 shows a hot-end equipment portion of a typical process for manufacturing glass articles. Molded hot-glass articles 2 (molding equipment not shown in the figure) are pushed by a sweepout assembly 4 from a dead-plate guide 3 to a conveyor 5 which conveys the hot-glass articles toward other process equipment, such as a transfer unit 7 or an annealing oven (not shown). The sweepout assembly 4 is actuated by an actuator or other actuating means 6 (partially shown in two positions). Actuating means 6 can include hydraulic actuators, pneumatic cylinders, magnetic operators, solenoid or electrical actuators, or manually-actuated transfer devices. The sweepout assembly 4 may be directly pushed by actuating means 6 or attached to a connector element which is rotated and/or pushed by the actuating means.

Two positions of the sweepout assembly 4 are shown in FIG. 1. The sweepout assembly 4 is shown dotted in a retracted position and solid in an extended position. The extended position places the hot-glass articles 2 on the conveyor 5 before the sweepout assembly is returned to the retracted position. In the arcing move toward the retracted position as shown, the sweepout assembly 4 passes across the dead-plate guide 3 prior to other (recently molded) hot-glass articles 2*a* being lowered or otherwise placed on the deadplate guide. After the sweepout assembly 4 reaches the retracted position and the additional hot-glass articles 2*a* are lowered onto the dead-plate guide 3, the additional hot-glass articles 2*a* are swung/pushed onto the conveyor 5 by the sweepout assembly 4 moving from the retracted to extended position to complete a cycle.

The sweepout assembly 4 tends to initially move hot-glass articles along an arc having an initial component in the x direction toward the conveyor 5. At the conveyor 5, the sweepout assembly 4 typically moves in a direction having a component in the conveyor motion or y direction. Near the extended position, the conveyor 5 typically moves slightly faster than the y component motion of the sweepout assembly. The slightly faster motion of the conveyor tends to pull the glass articles out of the spaces S of the sweepout assembly 4.

Figure 2:
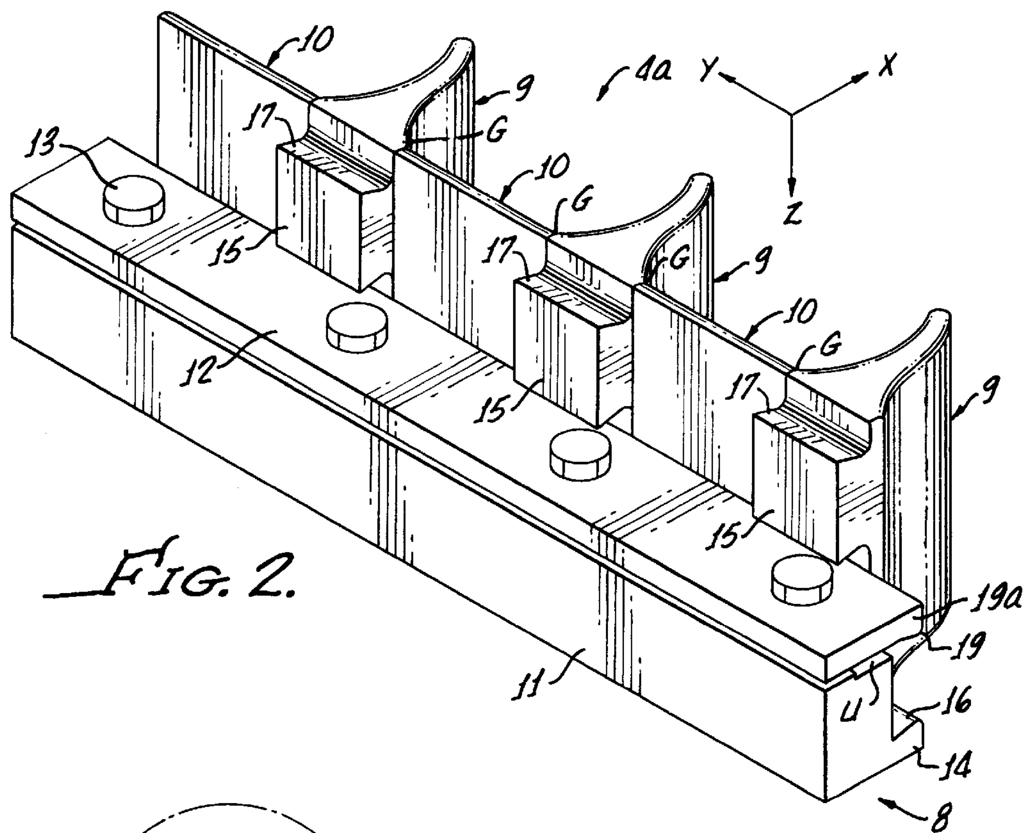
FIG. 2 shows an orthogonal view of a sweepout assembly of the invention incorporating pads having multiple support projections.

FIG. 2 shows an orthogonal view of a preferred embodiment of a sweepout assembly 4*a* which incorporates the present invention. The sweepout assembly 4*a* comprises a support assembly 8, a plurality of glass-contacting pads or inserts 9, and spacers 10. The support assembly 8 is designed so that pads 9 and spacers 10 can be slidably positioned and removably attached. The support assembly 8 comprises a mounting block 11, a block cap 12, and one or more threaded fasteners such as bolts 13. Each shaft of bolts 13 passes through a bolt passageway or counterbore (see item 22 in FIG. 4*a*) in the block cap 12. The bolthead portion of the bolts 13 forces the block cap 12 down (in the direction Z) as the threaded portion of the bolts mates with a female threaded portion (not shown in the figures) within the block 11. Alternatively, other means for attaching cap 12 to block 11 (instead of threaded fasteners) include clamps, rivets, spring clips, and press fit pegs or pins. In addition to the bolts 13 shown in FIG. 2, alternative threaded fasteners for attaching cap 12 to block 11 include: threaded dowel pins, studs and wing nuts, screws, and bolts with washers, spacers, or lock washers.

The pads 9 are slidable in a generally horizontal plane or y direction and separated from each other by one or more spacers 10 in a preferred embodiment shown. The spacers 10 provide spaced apart distances between the pads 9 ranging from about 1 to 12 inches (about 2.54 to 30.48 cm), but more typically within the range of about 1.9 to 2¼ inches (about 4.83 to 12.86 cm). The spacers 10 also provide a hot-glass contact surface (see item 23 in FIG. 5*a*) proximate to the support assembly 8, which surface prevents hot-glass from contacting the metal block 11 or cap 12. Although shown separated by spacers 10, the pads 9 may also be adjoiningly located in an alternative embodiment of the sweepout assembly 4*a*.

The slidable design and placement of spacers 10 between the pads 9 also creates vertical (i.e., in the z direction) interfaces or gaps G between pads and spacers. The interfaces or gaps G allow the nonmetallic and metallic components of the sweepout assembly 4*a* to expand and contract at different rates without excessive thermal stresses as the sweepout assembly increases or decreases in temperature during hot-glass contacting applications. This tends to avoid distortion or other damage to the sweepout assembly 4*a* and damage to the hot-glass articles.

Generally, manual means for repositioning the pads 9 is preferred, e.g., manually loosening of the bolts 13, manually removing the pads from the support assembly 8 (if required), manually repositioning (e.g., sliding or inverting) the pads, manually replacing the repositioned pads into the support assembly 8 (if required), and manually tightening the bolts. However, other manual and nonmanual means for repositioning are also possible. These other repositioning means include hydraulic actuators, pneumatic positioners, and remotely operated mechanical levers. Although a preferred manual means for repositioning allows adjustability of the pads 9 in several directions and orientations, alternative attachment means and repositioning means may only allow repositioning in a limited number of discrete positions of the attached pads, e.g., actuators may allow slidable positioning, but not inverting of the pads.

The support assembly 8 is typically substantially composed of a metallic material for strength and rigidity, preferably aluminum or steel. In a preferred embodiment as shown, the block 11 is derived from a length of aluminum bar or channel stock composed of 6061-T6 aluminum. The block 11 may also be derived from other sources, including angle iron, slotted metal plate, box beam, and steel bar. In an alternative embodiment, a single-piece metal conduit with a slot is used to form the support assembly 8, the conduit being capable of at least partially containing a flow of a cooling fluid, e.g., ambient air. The cooling fluid flow may also be directed toward contact surfaces and/or the hot-glass articles through openings in the conduit. Alternative materials of construction for the support assembly 8 include other metals, coated metals, laminated materials, and ceramics.

Although shown in FIG. 2 as a straight, rectangular shape, the block 11 can be made in any convenient shape for the application, for example an arcuate beam. Pad attaching arms (e.g., arms connected to a beam) can also be included in other embodiments, but this may limit slidable attachment capability of the pads 9. See copending application Ser. No. 08/234,936, filed on Apr. 28, 1994, for an alternative configuration of a support with nonmetallic pads mounted on arms, which application is related to application Ser. No. 07/906,704, filed Jun. 30, 1992, and issued as U.S. Pat. No. 5,324,340 on Jun. 28, 1994, these prior filed applications and the issued patent are incorporated in their entirety herein by reference. Alternative block configurations may contain contact pads 9 mounted on opposing sides of the block or arms, thereby allowing the sweepout assembly to be flipped and the other side used when the pads on one side wear out. Pads on opposing sides of a block or arms may also be configured to yield differently shaped contact surfaces if only one side of the sweepout assembly is used at any one time. In this manner, different embodiments of the sweepout assembly provide maximum flexibility and service from the nonmetallic pads.

A preferred embodiment of the block 11 includes an undercut U and a block protrusion 14 extending generally along the Y direction. The undercut U allows a cap protrusion 19*a* and block protrusion 14 to be compressed to firmly contact the projections 15 on pads 9. The protrusions are shaped and dimensioned to mate with a projection 15 (see FIG. 3*b*) on each pad 9 and with a similar projection 15 on each spacer 10 (see FIG. 5). The shapes of the block protrusion 14, cap protrusion 19*a*, and projections 15 also provide rotational rigidity and stability as well as support when the cap 12 and block 11 are bolted together. The block protrusion 14 has a contact surface 16 which generally contacts the upper mating surface 17, but may also contact the lower mating surface 18 (see FIG. 3*b*) of another projection 15 if the pad 9 is oriented in an inverted position.

The similar interior mating surfaces 17*a* and 18*a* (when combined with the upper and lower mating surfaces 17 & 18) allow horizontal and vertical repositioning of a pad 9 by simply shifting the attachment of pad 9 up or down along the z direction and/or slidably repositioning of the pad sideways in the y direction. Alternative embodiments of a pad may include projections which can alter the position of the contacted hot-glass article with respect to the support assembly 8, e.g., repositioning the pad 9 in the x direction.

The block cap 12 includes a cap protrusion surface 19 on cap protrusion 19*a* to repositionally engage upper portions of projections 15 on pads 9 and spacers 10. Although the shape of the cap protrusion surface 19 is shown similar to that of an inverted block protrusion surface 16 in a preferred embodiment, different cap protrusion surface shapes in alternative embodiments can provide additional repositional capabilities. For example, alternative cap and block protrusions extending to slightly different locations in the x direction would provide a different vertical tilt to an alternative mating pad 9 and an inverted alternative mating pad 9. A multi-directional repositioning capability is provided by alternative and multiple projections 15 on each pad 9, the sliding capability of projections 15 on support assembly 8, the different sized spacers 10, and/or the interchangeability of similar or different protrusions. The repositioning capability includes various outward extensions in the x direction, different center-to-center spacing of glass articles and pads 9 in the y direction, offsetting of a pad in the z direction, and rotating the orientation of a pad so that its glass-contact surfaces face in opposite directions. The variously repositionable elements and element configurations provide a capability to handle and transfer different diameter hot-glass articles in different pushing directions with minimal pad removal or other potential for damage. Different glass contact angles for similarly sized hot-glass articles can also be provided.

As shown in FIG. 2, the preferred shape of cap 12 and block 11 forms an open-sided, box beam-type assembly 8, preferably both the block and cap composed of 6061-T6 aluminum. As can also be seen in FIG. 2, the protrusions 19*a* and 14 of cap 12 and block 11, respectively hold either projection 15 of pad 9 or the projection 15 of spacer 10 when the cap and block are clamped together by threaded fasteners or bolts 13. The box beam-type design and mating projections 15 provide rigidity and allows simple assembly and disassembly. Alternative embodiments of a support assembly can include: a spacer or separator element between the cap 12 and block 11, thereby allowing the cap and block to support pads having different projection dimensions; a spring element contacting the pads and attached to either the block or cap in place of a mating surface of a protrusion thereby minimizing the chance of excessive clamping loads being transmitted to the graphite pad; and set screw elements attached to the block thereby further restraining potential sliding motion of the pads after assembly.

The block 11 is formed from material stock that is typically thicker than that used to form the cap 12 and both are typically machined into the shapes shown. Although one block 11 and one cap 12 have been shown in the support assembly, a plurality of blocks and caps may be required to move larger or geometrically diverse hot-glass articles. For example, large or tall bottles may require contact by two sweepout assemblies proximate to the bottom and tops of the bottles.

Another alternative support embodiment is a single metal element having a cap-like portion and a block-like portion. A slot in the single element alternative, similar to undercut U shown on FIG. 2, when combined with the elastic strength properties of many metals, allow protrusions 19*a* and 14 on the cap-like and block-like portions of the alternative support embodiment to grasp projections 15 of pads 9 and spacers 10 when the portions are squeezed together.

Generally, the pads 9 are assembled as shown in FIG. 2, positioned between spacers 10 to form a regular pattern in sweepout assembly 4*a*. However, protrusions 14 & 19*a* may also be discontinuous in the y direction or irregularly placed along the z direction in an alternative embodiment to support an irregular pattern of pads and/or spacers. In this manner, customized assembly shapes can be produced using only one shape of pads 9. Different shapes and sizes of pads and spacers may also be used in conjunction with irregular protrusion shapes.

Figure 3A:
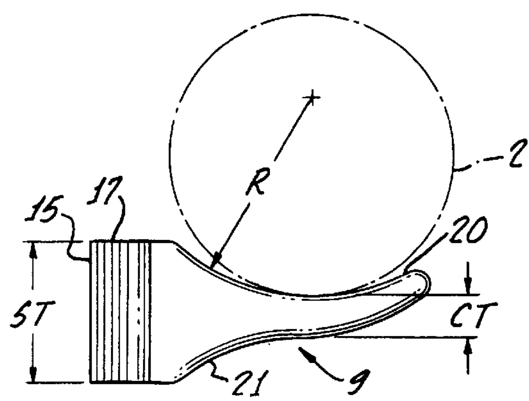
FIG. 3*a* shows a top view of a pad of the invention.
Figure 3B:
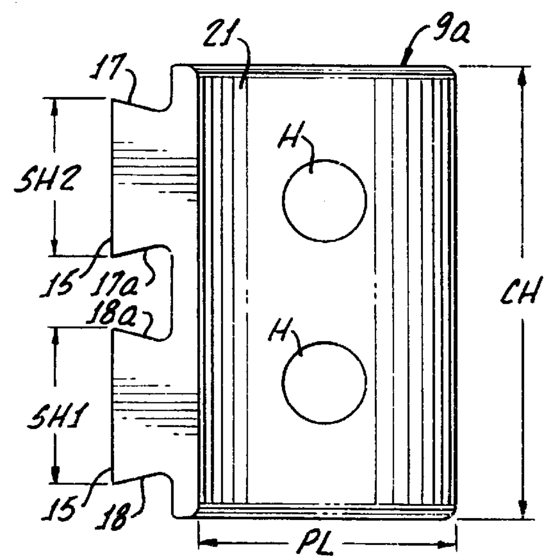
FIG. 3*b* shows a side view of a pad of the invention.

FIG. 3*a* is a top view and FIG. 3*b* is a side view of a pad 9 and alternative pad 9*a*, respectively, both having a contact arm defined by concave and convex contact surfaces 20 and 21. When assembled, the arm of non-metallic pad 9 or 9*a* is oriented to contact and push a hot-glass article 2, shown dotted in FIG. 3*a*. The concave contact surface 20 of the pad 9 cradles the hot-glass article 2 and distributes contact loads. The convex contact surface 21 provides a contact surface for a neighboring hot-glass article (not shown in the figure). When assembled, spacers 10 (see FIG. 2) and contact surfaces 20 and 21 of neighboring pads 9 interact to form a mosaic or multi-element surface for contacting one or more hot-glass articles. The multi-element contact surface forms a plurality of glassware pockets or spaces which are capable of pushing hot-glass articles with minimal thermal and mechanical damage.

The contact surfaces 20 & 21 of the contact arm extend outwardly (in the x direction) to a tip opposingly located from a support projection 15 in a preferred embodiment shown. The nonmetallic material and opposed location of the contact arm tip minimizes the chance for contact with and heating of the metal support assembly 8 by hot-glass articles. In other embodiments of the invention, the contact surfaces 20 & 21 can be located at different locations relative to the projections 15, e.g., closer to the projections 15, if the shape and composition of the pads minimize hot-glass contact with and heating of the support assembly 8.

The pads 9 are preferably composed of a ceramic material, more preferably a tough grade of graphite, which is substantially free of plastic or other nonmetallic resins or fibers. Preferably, pads 9 are composed of a GLASSMATE-SR® graphite supplied by Poco Graphite Company, located in Decatur, Tex. The GLASSMATE-SR® graphite has the following strength properties at room temperature: a minimum compressive strength of about 11,500 psi and a minimum flexural strength of about 4,400 psi. However, alternative materials of construction for the pads 9 may have a minimum compressive strength of as little as 6,000 psi or less and a minimum flexural strength of 2,500 psi or less. More preferred is a compressive strength of at least about 15,000 psi and a minimum flexural strength of at least about 7,000 psi. These strengths are slightly changed at the elevated temperatures the pads are exposed to in a typical hot-glass handling application. Alternative materials of construction for the pads 9 and spacers 10 may include GLASSMATE, GLASSMATE-LT, and CXT graphites (all supplied by Poco Graphite); fiber-filled plastic resins (such as DURATEMP, supplied by Duratemp Inc., Indiana); treated woods; and carbon-carbon composites.

GLASSMATE-SR graphite is the preferred graphite pad material because its minimum flexural strength, a key physical property, is relatively high for a graphite. In contrast, many other carbon and graphite materials have a lower flexural strength and have anisotropic properties, i.e., have a lower flexural strength in at least one direction. The uniformly high flexural strength of the preferred pad materials enables the pads to push hot-glass articles in several directions, facilitates the removal and handling of pads without damage, and allows for the reliable resecuring of pads to the support assembly at different positions and orientations.

Table 1 provides other typical physical properties of the preferred GLASSMATE-SR graphite material. This graphite material, especially when combined with an arcuate shape of contact surface 20 of a pad (see FIG. 3*a*), enables the directional control of the hot-glass articles to be changed without scratching or other mechanical and thermal damage to the article. Use of this graphite material also protects the metal support assembly from the harsh temperature and erosive environment without the need for additional cooling, e.g., forced air or water cooling, of the hot-glass articles, the sweepout assembly, or the support assembly.

TABLE 1

PHYSICAL PROPERTIES OF GLASSMATE-SR ®

| | Typical Value |
|---|---|
| Property (at room temp.) | |
| Density (g/cc) | 1.80 |
| Hardness (Shore Scleroscope) | 64 |
| Thermal Conductivity (BTU-ft/ft$^2$-hr-°F.) | 65 |
| Coefficient of Thermal Expansion ($\mu$in/in/°C.) | 8.2 |
| Property (at an elevated temp. of 1000° F.) | |
| Density (g/cc) | 1.80 |
| Hardness (Shore Scleroscope) | 64 |
| Thermal Conductivity (BTU-ft/ft$^2$-hr-°F.) | 42 |
| Coefficient of Thermal Expansion ($\mu$in/in/°C.) | 8.0 |

The contact surfaces 20 & 21 of pads 9 are preferably arcuate in order to improve the glass article containment and control during pushing. The arcuate shape also improves the conveyor discharge characteristics of the sweepout assembly 4*a*. Although a constant radius of curvature R of the concave surface 20 (see FIG. 3*a*) is preferred for substantially cylindrical hot-glass articles such as bottles, alternative arcuate shapes for the contact surfaces are also possible. Alternative contact surface shapes may include planar surface portions (e.g., similar to the contact surface 23 of spacer 10 as shown in FIG. 5*b*) or more complex shapes, e.g., to provide several, spaced-apart contact surfaces for pushing noncylindrical hot-glass articles.

A preferred arcuate shape has a radius of curvature R of about 1¼ inches (about 3.18 cm). This radius of curvature allows sweepout assembly 4*a* to reliably push a plurality of cylindrical hot-glass articles varying in diameter from about 2 to 4 inches (about 5.04 to 10.08 cm). In another embodiment, cylindrical hot-glass articles ranging in diameter from about 3 to 6 inches (about 7.62 to 15.24 cm) can be accommodated by a contact surface of a pad having a radius of curvature of about 1¾ inches (about 4.44 cm). In still other embodiments, the radius of curvature R can range from about 1 to 10 inches.

Other dimensions of a graphite pad 9 are normally chosen to provide strength and to allow heat from the hot-glass work piece to diffuse throughout each pad without creating a thermal shock. For example, for GLASSMATE-type graphite pads having a coefficient of thermal expansion ranging from about $7\times10^{-6}$ to $9\times10^{-6}$ per °Centigrade, thickness ST (as shown in FIG. 3*a*) of projection 15 is typically in the range of about 1 to 3 inches (about 2.54 to 7.62 cm), more typically in the range of about 1¼ to 1½ inches (about 3.18 to 3.81 cm). Contact arm thickness CT (as shown in FIG. 3*a*) between concave and convex contact surfaces 20 & 21 is typically in the range of about ⅛ to 1 inches (about 0.32 to 2.54 cm), more preferably in the range of about 0.31 to 0.5 inches (about 0.79 to 1.27 cm). The ratio of support thickness ST to contact thickness CT is typically in the range from about 1:1 to 10:1, more preferably in the range from about 3:1 to 4:1.

The contact arm or pad height CH shown in FIG. 3*b* is typically a function of the height of the hot-glass article being handled. For handling hot-glass bottles approximately 8 inches (about 20.32 cm) tall, a typical contact arm height CH can range from about ½ to 6 inches (about 1.27 to 15.24 cm), more preferably from about 1¾ to 3⅝ inches (about 4.44 to 9.21 cm). The support projection heights SH1 and SH2 of the first and second projections are a function of the block 11 and cap 12 design (shown in FIG. 2), but support projection heights typically range from about ½ to 3 inches (about 1.27 to 7.62 cm), more preferably from about 1 to 2 inches (about 2.54 to 5.08 cm).

As shown in FIG. 3*b*, pad 9*a* differs from pad 9 (e.g., as shown in FIG. 2) by containing fluid flow ports or holes H drilled or otherwise formed therein and extending from pad contact surface 20 to contact pad surface 21. The holes H allow air circulation between the spaces formed by adjacent pads and help to prevent unwanted air movement in the x direction during extension and retraction operation of the sweepout assembly. Holes H may be especially useful for embodiments having larger contact surfaces 20 and 21 that extend significantly outward from projections 15 and support assembly 8 (see FIG. 2) when attached. Outward extension PL of the contact arm and surfaces can typically range from about ½ to 10 inches (about 1.27 to 25.4 cm), but more typically range from about 1½ to 2½ inches (about 3.81 to 6.35 cm).

Although a single cap protruding surface 19 of cap 12 is a preferred embodiment shown in FIG. 2, dual cap surfaces 19 of alternative cap 12*a* shown in FIGS. 4*a* & 4*b* may provide several benefits. The dual cap surfaces 19 allow the alternative cap 12*a* to be reversed if one of the cap surfaces 19 becomes worn. The dual cap surfaces 19 of alternative cap 12*a* produce a symmetrical shape which can be easier to fabricate. If the alternative cap is formed from spring steel or other elastic materials, the cap can also function as a bias element minimizing the loads transmitted by both cap surfaces 19 and avoiding damage caused by excessive torques applied to threaded fasteners or bolts 13. In other alternative embodiments, other bias elements can be placed between the cap 12 and block 11 tending to separate cap surface 19 from block protrusion surface 16 when threaded fasteners or bolts 13 are loosened.

FIGS. 5*a* and 5*b* show top and side views of an alternative spacer 10*a* with a planar glass-contact surface 23. Spacer height SH of glass contact surface 23 is preferably similar to height CH of the pads 9, but alternative embodiments of spacers can have different spacer heights, irregular spacer heights, or a non-planar shape of glass-contact surfaces 23.

The alternative spacer 10*a* is similar to the spacer 10 shown in FIG. 2 except that it has dual projections 15 similar to each of the projections 15 shown on each pad 9. The shape of the single projection 15 of the spacer 10 or projections 15 of the alternative spacer 10*a* is designed to individually mate with the protrusions 14 and 19*a* of the block 11 and cap 12, but alternative embodiments of a spacer can have additional projections and/or one or more differently shaped projections.

The relatively thin thickness ST of the spacer 10*a* in a preferred embodiment is possible because the spacer is not expected to be exposed to as severe an environment as pads 9. As shown, the spacer has an overall thickness ST of about ¾ inch (about 1.90 cm) including a projection thickness PT of about ½ inch (about 1.27 cm). Overall spacer thickness ST typically ranges from about ¼ to 2 inches (about 0.64 to 5.08 cm), preferably from about ¾ to 1 inch (about 1.90 to 2.54 cm) thick.

Projection thickness PT of projection 15 (for pads and spacers) typically ranges from about ⅛ to 1 inch (about 0.32 to 2.54 cm), preferably from about ½ to ¾ inches (about 1.27 to 1.90 cm). The spacer length SL typically ranges from about ½ to 6 inches (about 1.27 to 15.24 cm), preferably from about 1¾ to 2¼ inches (about 4.44 to 5.72 cm). The projection angle "a" of a projection 15 shown in FIG. 5*b* is about 15 degrees, but can typically range from about 5 to 45 degrees for projections on spacers 10 and/or pads 9.

In addition to the ports or air holes H shown in FIG. 3*b*, the nonsmooth types of hot-glass contact surfaces (e.g., surfaces 20, 21, and 23) have also been found to be a significant variable when pushing and handling certain hot-glass articles without damage. Types of surfaces which include grooves, serrations, or other a rough finish have been shown to reduce damage to hot-glass articles in some applications. A surface roughness of a planar or arcuate surface of no smoother than about 125 $\mu$inches, RNS (average of root mean square measurements of the height of surface irregularities, measured in microinches) is preferred, more preferably no smoother than about 250 $\mu$inches, RMS average. However, a smoother surface finish such as 64 vinches, RMS average, may be tolerated for some applications. If an arcuate and serrated surface of a pad 9 is used for contacting some hot-glass articles having a diameter of about 3 inches, the serrated surface is preferably formed by milling to create an average ridge to trough dimension in the range of about 0.050 to 0.060 inches. Other processes for producing a serrated and/or roughened surface include grinding, abrasion, and erosion. Serrated surfaces having an average ridge to trough dimension of at least about 0.001 inch or less may be used for other contact surface applications, but the dimension is typically at least about 0.010 inches.

The serrated or roughened contact surface significantly improves handling performance in some hot-glass applications by reducing the actual (microscopic) glass contacting area at contact sites and increasing the distribution of the actual contact areas at these sites when compared to smoother contact surfaces. The use of serrated or roughened surfaces on the pads of the invention is possible because the pads are substantially composed of a non-abrasive, nonmetallic material such as graphite. Unlike a serrated or other metal surface having a rough finish which may tend to increase mechanical damage to hot-glass articles when compared to a smoother metal surface, the thermal and physical properties of rough or serrated graphite or other nonmetallic surfaces seem to reduce thermal and mechanical damage when compared to smoother contact surfaces. Although the pads 9 are typically maintained at elevated temperatures by being located near hot-glass molding equipment, the temperature of the pads is typically less than that of the hot-glass articles, and it is believed the smaller actual contacting area of a serrated or other rough contact surface reduces heat transfer from the hot-glass articles to the nonmetallic pads, thereby reducing checking or other thermal stress damage to the article. Furthermore, the combination of the arcuate shape, the serrated or other rough surface, and the nonmetallic composition is believed to better distribute mechanical loads to reduce mechanical damage.

Although some alternative embodiments of the invention have been described, other alternative embodiments are also possible. These include: (1) using porous or hollow pads which may be combined with a fluid flow through the pads for cooling; (2) employing complex contact surface shapes having multiple (separate) contact areas with cylindrical glass articles instead of a single contact area resulting from a relatively constant radius of curvature; (3) using pads having contact surfaces with a relatively constant radius of curvature but with different shapes, e.g., two concave surfaces instead of a concave and a convex surface; (4) adding a heating element for heating a pad and elevating its temperature to minimize heat transfer from the hot-glass articles, especially if a cooling fluid is flowing near the pads; and (5) attaching the pad to other process equipment to handle work pieces other than hot-glass at elevated temperatures.

While the preferred embodiment of the invention has been shown and described, and some alternative embodiments also shown and/or described, changes and modifications may be made thereto without departing from the invention. Accordingly, it is intended to embrace within the invention all such changes, modifications and alternative embodiments as fall within the spirit and scope of the appended claims.

What is claimed is:

1. A pad for contacting hot-glass articles comprising:

(a) a support connection surface capable of being attached to a support member; and (b) a nonmetallic glass-contact arm connected to and extending outwardly from said support surface, said arm having a front concave contact surface and a back convex contact surface.

2. A pad as defined by claim 1 wherein said support connection surface comprises a support projection.

3. A pad as defined by claim 2 wherein said support projection is capable of slidable contact with said support member in a direction having a substantial horizontal component.

4. A pad as defined by claim 2 wherein said nonmetallic, glass-contact arm consists essentially of a ceramic material.

5. A pad as defined by claim 4 wherein said ceramic material is graphite.

6. A pad as defined by claim 5 wherein said graphite has a flexural strength of at least about 4400 psi.

7. A pad as defined by claim 2 wherein said glass-contact arm extends outwardly from said support projection a distance of from about 1½ inches to about 2½ inches.

8. A pad as defined by claim 1 wherein said support surface comprises two support projections.

9. A pad as defined by claim 5 wherein said support projection consists essentially of graphite.

10. A pad as defined by claim 8 wherein said support projections and said nonmetallic, glass-contact arm consist essentially of a nonmetallic material having a minimum flexural strength of about 2500 psi.

11. A pad as defined by claim 10 wherein said nonmetallic material is graphite.

12. A pad as defined by claim 5 wherein said concave contact surface has a radius of curvature sized to push glass articles that are substantially cylindrical and have diameters ranging from about 2 to 4 inches.

13. A pad as defined by claim 2 substantially free of plastic resins and reinforcing fibers.

14. A pad as defined by claim 2 wherein said front concave contact surface has a roughness no smoother than about 125 mircoinches, root mean square average.

15. A pad for contacting hot-glass articles comprising:

(a) a first support connection surface capable of being attached to a support member;

(b) a second support connection surface capable of being attached to a support member, wherein said first and second support connection surfaces are positioned on said pad such that, when said pad is attached to said support member by one of said support connection surfaces, the other support connection surface is not attached to said support member and does not support said pad on said support member; and (c) a glass-contact surface.

16. A pad as defined by claim 15 wherein said first and second support connection surfaces are support projections.

17. A pad as defined by claim 16 wherein said glass-contact surface is arcuate.

18. A pad as defined by claim 16 consisting essentially of a nonmetallic material.

19. A pad as defined by claim 18 wherein said nonmetallic material is graphite.

20. A pad as defined by claim 17 wherein said arcuate glass-contact surface has a radius of curvature from about 1 to about 10 inches.

21. A nonmetallic pad for contacting hot-glass articles comprising:

(a) a first support projection capable of repositionable contact with a support member;

(b) a second support projection capable of repositionable contact with said support member, wherein said first and second support projections are positioned on said pad such that, when said pad is attached to said support member by one of said support projections, the other support projection is not attached to said support member and does not support said pad on said support member; and (c) a glass-contact surface.

22. A nonmetallic pad as defined by claim 21 wherein said glass-contact surface is planar.

23. A nonmetallic pad as defined by claim 21 wherein said glass-contact surface is arcuate.

24. A nonmetallic pad as defined by claim 21 consisting essentially of graphite.

25. A nonmetallic pad as defined by claim 21 wherein said first and second support projections are capable of slidable contact with said support member.

26. A nonmetallic pad as defined by claim 24 wherein said glass-contact surface is serrated and has an average ridge-to-trough dimension of at least about 0.050 inches.

27. A sweepout assembly for pushing hot-glass articles comprising:

(a) a support member; and (b) one or more pads as defined by claim 2 attached to said support member.

28. A sweepout assembly as defined by claim 27 further comprising one or more spacers having a glass-contact surface and a plurality of said pads slidably attached to said support member, wherein at least two of said pads are separated by a spacer.

29. A sweepout assembly as defined by claim 27 wherein said support member comprises metal.

30. A sweepout assembly for pushing hot-glass articles comprising:

(a) a support member; and (b) one or more pads as defined by claim 16, wherein each pad is attached to said support member by one of said support projections and the other support projection on each pad is not attached to said support member and does not support said pad on said support member.

31. A sweepout assembly as defined by claim 30 wherein said pad or pads are removably attached to said support member.

32. A sweepout assembly as defined by claim 30 further comprising a plurality of spacers having glass-contact surfaces wherein the glass-contact surfaces of said pads and the glass-contact surfaces of said spacers form a composite glass-contact surface capable of contacting a plurality of hot-glass articles having different sizes.

33. A sweepout assembly for pushing hot-glass articles comprising:

(a) a metal support member; and (b) a plurality of nonmetallic pads as defined by claim 21 wherein each pad is slidably attached to said support member by one of said support projections and the other support projection on each pad is not attached to said support member and does not support said pad on said support member.

34. A sweepout assembly as defined by claim 33 wherein said metal support member comprises:

(a) a block having a surface shaped to mate with a first surface of one of said support projections;

(b) a cap having a surface shaped to mate with a second surface of said support connection; and (c) means for removably attaching said cap to said block.

35. A pad as defined by claim 1 wherein a hole extends through said glass-contact arm from said front concave contact surface to said back convex contact surface.

* * * * *

UNITED STATES PATENT AND TRADEMARK OFFICE

CERTIFICATE OF CORRECTION

PATENT NO. : 5,814,120

DATED : Sept. 29, 1998

INVENTOR(S) : Patrick H. Lloyd et al.

It is certified that error appears in the above-indentified patent and that said Letters Patent is hereby corrected as shown below:

Column 3, line 5, after "repositionable" insert -- , --; line 6, after "vertically" insert -- , --.

Column 6, line 26, after "respectively" insert -- , --.

Column 10, line 19, after "finish" insert -- , --; line 20, cancel "vinches" and insert in place thereof -- μinches --.

Signed and Sealed this

Twenty-ninth Day of June, 1999

Attest:

Q. TODD DICKINSON

Attesting Officer

*Acting Commissioner of Patents and Trademarks*